(Model.)
R. HACKETT
Mortising Chisel.
No. 234,669. Patented Nov. 23, 1880.
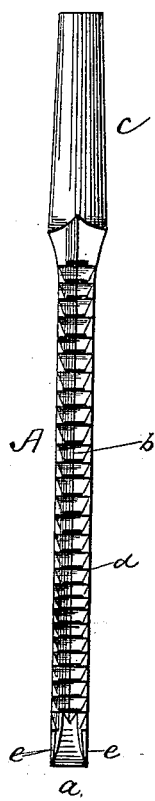
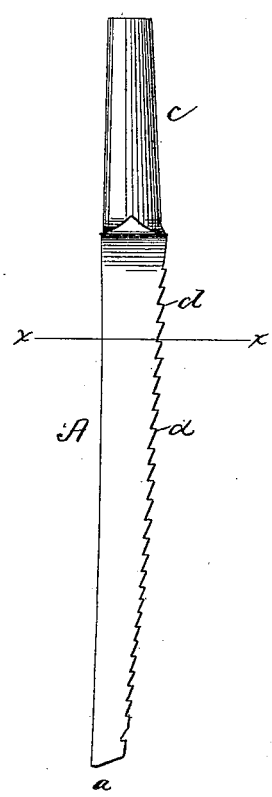
Attest.
W. H. K. Knight
F. F. Church.
Inventor.
Richard Hackett
By Hill & Church
His attys.

United States Patent Office.

RICHARD HACKETT, OF OSHKOSH, WISCONSIN.

MORTISING-CHISEL.

SPECIFICATION forming part of Letters Patent No. 234,669, dated November 23, 1880.

Application filed August 10, 1880. (Model.)

*To all whom it may concern:*

Be it known that I, RICHARD HACKETT, of Oshkosh, in the county of Winnebago and State of Wisconsin, have invented a certain new and Improved Mortising-Chisel; and I do hereby declare the following to be a full, clear, and exact description of the same, reference being had to the accompanying drawings, forming part of this specification, in which—

Figure 1 is a rear view; Fig. 2, a side view, and Fig. 3 a cross-sectional view.

Similar letters of reference in the several figures denote the same parts.

This invention has for its object to provide a strong and durable mortising-chisel, constructed so as to remove the cores or chips as fast as made, and which will not require more power to operate it than the ordinary chisel heretofore used.

To this end the invention consists of a chisel provided with a cutting-point and with cutting-flanges on its back side extending to its point and having a longitudinal V-shaped groove in its back extending from the cutting-flanges to its shank, and having serrations or teeth of substantially uniform depth extending laterally across such V-shaped groove, all as I will now proceed to describe.

In the accompanying drawings, A represents the body of the chisel, made straight on its front side and beveled or rounded off on its rear side at the end, so as to form a cutting point or edge, *a*.

Projecting from the rear side of the tool are two cutting-flanges, *e e*, which taper down to the point or edge *a*, as shown in Fig. 1.

A longitudinal V-shaped groove, *b*, is formed in the back of the tool, extending from the cutting-flanges way to the shank *c*, and serrations or teeth *d* of substantially uniform depth are formed across said grooves, as shown. The serrations or teeth being of V-shaped form take a more secure hold upon the cores or chips than if they were straight, and, as they extend from the cutting-flanges of the tool way to the shank, they operate positively to carry the chips or cores entirely out of the mortise.

I am aware of the patent to Shuler and Carpenter, dated August 27, 1872, No. 130,874, and also of the patent to J. S. Russel, dated August 14, 1877, No. 194,180, both for mortising-chisels, and I do not claim anything shown in either of said patents. My invention is an improvement upon the Shuler and Carpenter device in that the serrations extend way to the shank of the tool and operate positively upon the chips until they are ejected from the mortise; and it is an improvement upon the Russel device for the same reason, and for the further reason that the employment of a spring-tongue to assist in withdrawing the chips is dispensed with.

I claim as my invention—

The mortising-chisel herein described, provided with a cutting-point, *a*, and flanges *e e*, and having a longitudinal V-shaped groove, *b*, in its back extending from the flanges to its shank, and having serrations or teeth *d* of substantially uniform depth extending laterally across the V-shaped groove throughout its length, substantially as described, for the purpose specified.

RICHARD HACKETT.

Witnesses:
H. B. HARSHAW,
E. C. PORS.